United States Patent [19]

Arroyo et al.

[11] Patent Number: 4,510,348
[45] Date of Patent: Apr. 9, 1985

[54] NON-SHIELDED, FIRE-RESISTANT PLENUM CABLE

[75] Inventors: Candido J. Arroyo, Lilburn; Nicholas J. Cogelia, Duluth; Ralph J. Darsey, Lawrenceville, all of Ga.

[73] Assignees: AT&T Technologies, Inc., Berkeley Heights; AT&T Bell Laboratories, Murray Hill, both of N.J.

[21] Appl. No.: 479,249

[22] Filed: Mar. 28, 1983

[51] Int. Cl.$^3$ .............................................. H01B 7/00
[52] U.S. Cl. ............................ 174/121 A; 174/121 R; 174/121 SR
[58] Field of Search ......... 174/121 A, 121 R, 121 SR

[56] References Cited

U.S. PATENT DOCUMENTS

| | | | |
|---|---|---|---|
| 2,691,694 | 10/1954 | Young | 174/121 R |
| 3,265,808 | 12/1963 | Binch | 174/121 A X |
| 3,425,865 | 2/1969 | Shelton, Jr. | 174/121 R |
| 3,692,924 | 9/1972 | Nye | 174/120 SR |
| 4,051,324 | 9/1977 | Anderson et al. | 174/121 R |
| 4,134,953 | 1/1979 | Dembiak et al. | 174/120 SR X |
| 4,150,249 | 4/1979 | Pedersen | 174/121 A X |
| 4,151,366 | 4/1979 | Betts et al. | 174/121 A X |
| 4,154,976 | 5/1979 | Brorein | 174/121 A X |
| 4,284,842 | 8/1981 | Arroyo et al. | 174/121 A X |
| 4,327,001 | 4/1982 | West et al. | 428/378 X |
| 4,370,076 | 1/1983 | Sullivan et al. | 174/120 SR |

FOREIGN PATENT DOCUMENTS 2120152 5/1972 Fed. Rep. of Germany ...... 174/120 SR

OTHER PUBLICATIONS

Plenum Cable of Teflon ®·FEP, Du Pont Catalog.
Kapton, Polyimide Film, A Light Extremely Tough Insulation Available for Highest Reliability Performance, Du Pont Catalog.
Kapton, Polyimide Film, High Performance Wire and Cable Insulation, Du Pont Catalog.

*Primary Examiner*—A. T. Grimley
*Assistant Examiner*—Morris H. Nimmo
*Attorney, Agent, or Firm*—E. W. Somers

[57] ABSTRACT

A relatively small pair size cable (20) comprising at least one insulated conductor (22) is provided with a flame retardant, smoke suppressive non-metallic sheath system (30). The sheath system has a relatively low thermal conductivity and provides a predetermined delay prior to the thermal decomposition of the conductor insulation. It includes an inner layer (31) of an inorganic cellular material which has a relatively low air permeability and two tapes (41, 42) which are wrapped helically about the inner layer with overlapped sealed seams. Each tape comprises a flame retardant thermosetting material. In an alternative embodiment, the heat absorptivity of the sheath system is increased substantially to facilitate the sealing of the seams as the cable is moved along a manufacturing line. This may be accomplished by using an inorganic cellular material which has a relatively high absorptivity or by facing the inner layer or one of the tapes with a material which is heat absorptive.

14 Claims, 8 Drawing Figures

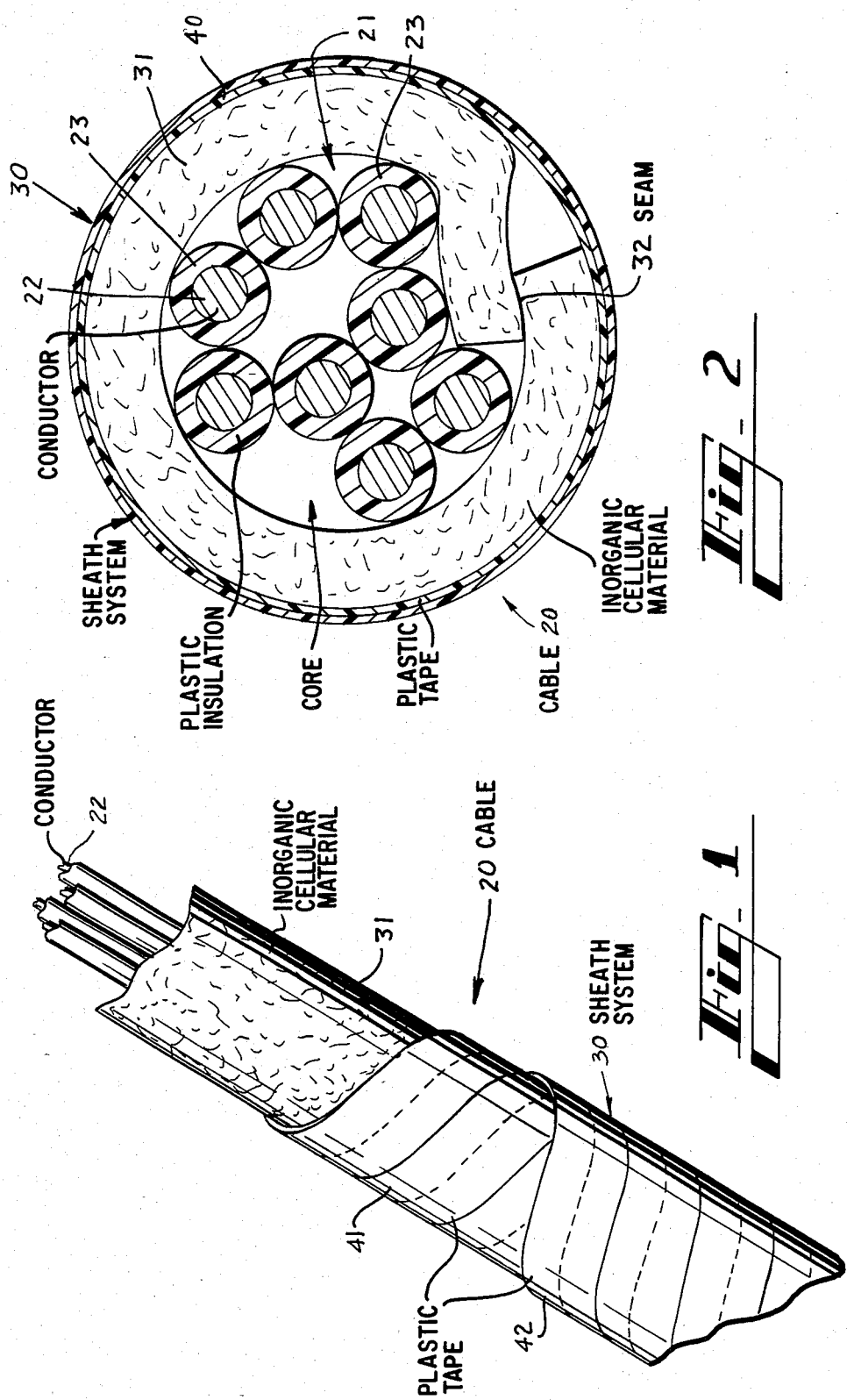

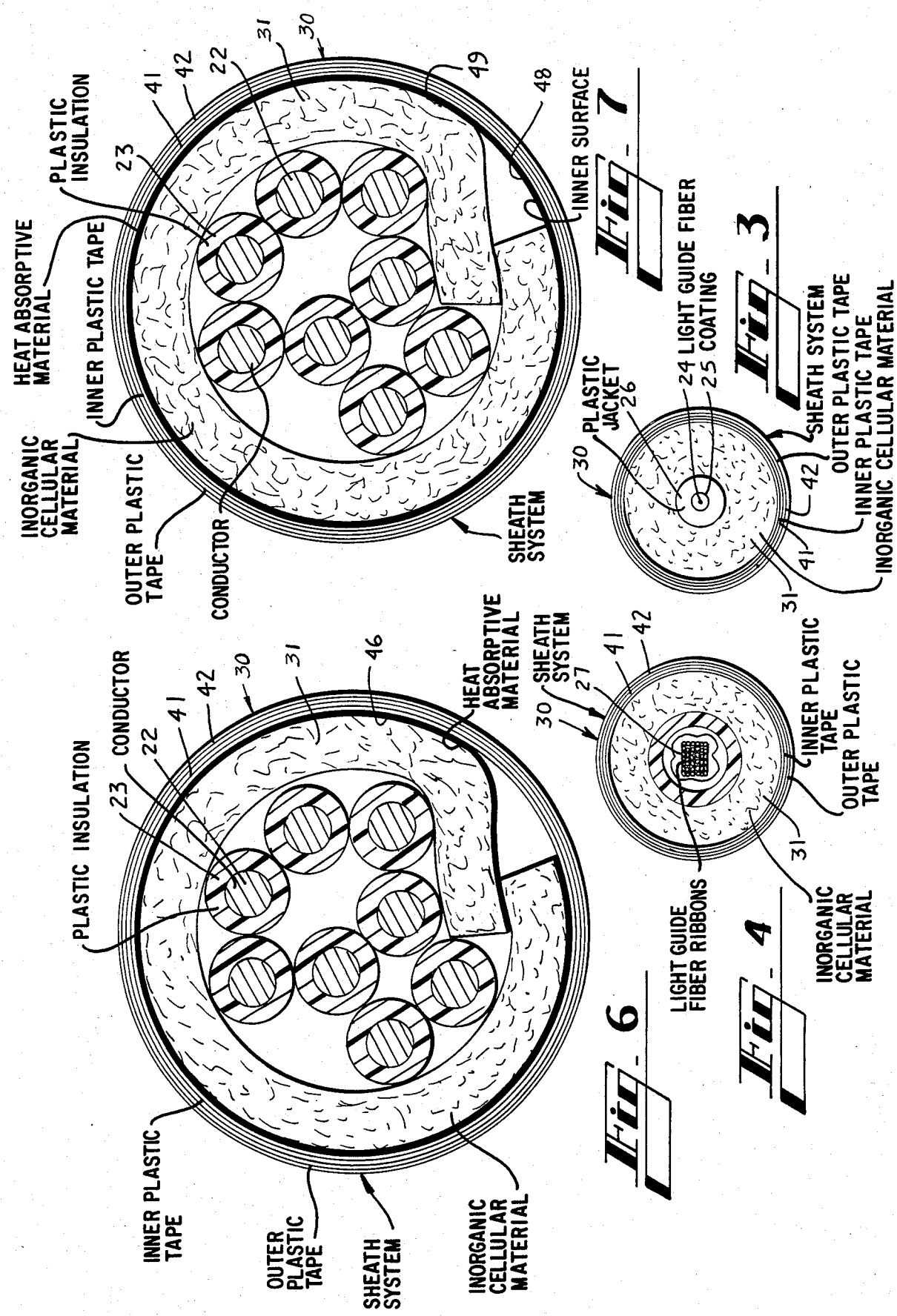

NON-SHIELDED, FIRE-RESISTANT PLENUM CABLE

TECHNICAL FIELD

This invention relates to a non-shielded cable having resistance to flame spread and smoke evolution, and, more particularly, to a relatively small pair size cable which is ideally suited for telecommunications use in building plenums.

BACKGROUND OF THE INVENTION

In the construction of many buildings, a finished ceiling, which is referred to as a drop ceiling, is spaced below a structural floor panel that is constructed of concrete, for example. Light fixtures as well as other items are supported by the drop ceiling. The space between the ceiling and the structural floor from which it is suspended serves as a return-air plenum for elements of heating and cooling systems as well as a convenient location for the installation of communications, computer and alarm system cables. It is not uncommon for these plenums to be continuous throughout the length and width of each floor.

When a fire occurs in an area between a floor and a drop ceiling thereabove, it may be contained by walls and other building elements which enclose that area. However, if and when the fire reaches the plenum, and if flammable material occupies the plenum, the fire can spread quickly throughout an entire story of the building and smoke can be conveyed through the plenum to adjacent areas. The fire could travel along the length of communications cables which are installed in the plenum. In the past, these cables which comprised a core of individually insulated conductors were enclosed in a jacket comprising a plastic material.

Generally, a cable in which the sheath comprises only a plastic jacket does not exhibit what are now totally acceptable flame spread and smoke evolution properties. As the jacket temperature in such a cable rises, gaseous pyrolysis products evolve, and charring of the jacket material begins. Afterwards, conductor insulation begins to decompose and char. If the jacket char retained its integrity, it could function to insulate the core, but in this cable, it is ruptured by the expanding insulation char, exposing the virgin interior of the jacket and insulation to elevated temperatures. The jacket as well as the restricted insulation char begin to pyrolize and emit flammable gases. These gases ignite and, by convection, burn beyond the area of flame impingement, propagating flame and evolving smoke.

Because of the possibility of flame spread and smoke evolution, particularly when aided by flammable insulation of cables, the National Electric Code (NEC) requires that electrical cables in plenums be enclosed in metal conduits. Since rigid metal conduits are difficult to route in plenums congested with other items, a rearrangement of office telephones which in some companies has become almost an annual event, is extremely expensive. However, the code permits certain exceptions to this cost prohibitive requirement. For example, flame-resistant, low smoke producing cables without metallic conduit are permitted provided that such cables are tested and approved by an authority such as the Underwriter's Laboratories. What is need for use in buildings is a cable which is relatively inexpensive to manufacture, but which meets the NEC requirements for flame retardance and smoke evolution, and which has suitable mechanical properties such as flexibility.

In the marketplace, cable which comprises a core enclosed in a paper wrap and in a relatively thick metallic shield is available, but it is relatively inflexible and somewhat difficult to maneuver in plenums. Also, care must be taken during installation to guard against possible electrical shock which may be caused by the metallic sheath of the above-described cable engaging exposed electrical service wires or equipment in a plenum. One commercially available plastic material has been accepted as the covering material for plenum cable without the use of metal conduit, but it is relatively expensive and is difficult to process.

A plenum cable that has superior resistance to flame spread and smoke evolution, and that is attractively priced is shown in U.S. Pat. No. 4,284,842 which issued on Aug. 18, 1981 in the names of C. J. Arroyo, N. J. Cogelia and R. J. Darsey and which is incorporated by reference hereinto. It includes a reflective sheath system which encloses a core and which comprises a layer that is made of a core wrap material and a metallic barrier or shield having longitudinal edge portions that form a seam. The metallic barrier which reflects radiant heat outwardly is covered with two translucent tapes. Each tape is wrapped helically about the core with overlapped séaled seams.

The foregoing sheath system, which depends on its reflection characteristics to keep the heat away from the core is well suited to larger pair size plenum cables. However, for smaller pair size cables such as those containing less than twenty-five pairs, the use of a metallic shield is not only expensive, but is very difficult to form about the core. Inasmuch as the metallic barrier reflects heat, manufacturing line speeds must be low enough to allow sufficient heat energy to be transferred to adhesive on the tapes to seal the seams.

What is needed and what is not provided by prior art products is a relatively inexpensive, flame retardant, smoke suppressive sheath system for a relatively small pair size plenum cable. The sought after cable desirably is easier to manufacture than presently available products and is capable of being made available in sufficient quantities to satisfy escalating demands.

SUMMARY OF THE INVENTION

The foregoing needs have been met by the cable of this invention which includes a core comprising at least one insulated conductor that may be a metallic or a lightguide fiber conductor. The cable is protected by a non-metallic sheath system having a relatively low thermal conductivity. Such a sheath system is effective to provide a predetermined time delay before any thermal decomposition of the conductor insulation when the cable is subjected to relatively high temperatures. More particularly, the sheath system includes an inner layer of an inorganic cellular material which has a relatively low air permeability and which encloses the core. At least one tape comprising a flame retardant thermosetting material is wrapped helically about the layer of cellular material.

In a preferred embodiment, the sheath comprises a layer of woven glass material and two tapes each comprising a Kapton ® film material which are wrapped helically in opposite directions about the core. These components of the sheath system cooperate to delay the transfer of heat energy during a fire for at least a predetermined time. Either the cellular layer or one of the tapes may be made to have a relatively high heat absorptivity, such as, for example, by providing an outer face of the cellular layer or an inner face of the one of the tapes with a heat absorptive material.

The cable of this invention is particularly useful in providing a desired degree of flame retardance for small pair size cables which includes less than twenty-five pairs of insulated metallic conductors. Inasmuch as the cables does not include a metallic shield, it is more flexible, thereby facilitating installation. Another advantage of this cable relates to its manufacture. In the preferred embodiment, each of the two outer tapes is coated on at least one of its major faces with an adhesive. After the tapes are wrapped helically in opposite directions with overlapping adjacent turns about the layer of cellular material, the cable is subjected to heat to cause the adhesive to melt and seal the overlapping seams. Without a metallic shield it becomes possible to increase the temperature of the source used to seal the seams and to use a higher line speed.

BRIEF DESCRIPTION OF THE DRAWINGS

Other features of the present invention will be more readily understood from the following description of specific embodiments thereof when read in conjunction with the accompanying drawings in which:

FIGS. 1 and 2 are perspective and end views of cables of this invention which have superior flame and smoke retardance properties with an overlapped seam in FIG. 2 being exaggerated for purposes of clarity;

FIGS. 3 and 4 are end cross-sectional views of lightguide cables which embody a sheath of this invention;

FIGS. 6 and 7 are end cross-sectional views of alternative embodiments of this invention.

DETAILED DESCRIPTION

Figure 5:
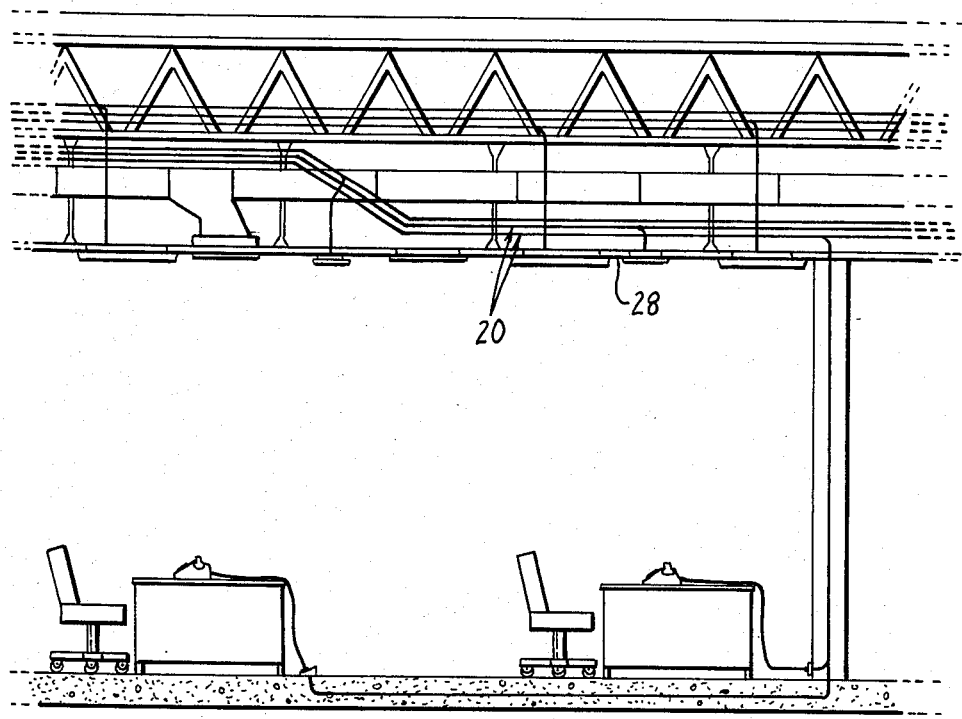
FIG. 5 is an elevational view of a portion of a building to show an environment in which the cable of this invention may be used.

Referring now to FIGS. 1 and 2, there is shown a communications cable, which is designated generally by the numeral 20 and which is flame retardant and smoke suppressive. It includes a core 21 having a relatively small number of pairs of individually insulated conductors 22—22. Generally, insulation 23 which covers each of the conductors of the core is a somewhat flame retardant plastic material such as, for example, polyvinyl chloride (PVC). The core 21 typically includes a number of insulated conductor pairs, e.g. less than twenty-five pairs, which is relatively low compared to the number included in a stub cable which services a building. The core 21 could be one which is suitable for use in computer and alarm signalling networks.

It should be realized that the core 21 also may be one which is used in lightwave communications. As such, it could include a single lightguide fiber 24 (see FIG. 3) which is coated with a protective material 25 and enclosed in a sheath which includes strength members and a fire retardant plastic jacket 26. Or, it could include one or more lightguide fiber ribbons 27—27 (see FIG. 4) such as those described in an article authored by Frank T. Dezelsky, Robert B. Sprow and Francis J. Topolski and entitled "Lightguide Packaging" which appeared in the Western 1980 issue of the Western Electric Engineer beginning at page 81. Depending on the structure of the conductors themselves, such a cable may have a lower fuel content than a cable which includes insulated metallic conductors.

As will become apparent from test results disclosed hereinafter, the cable 20 of this invention satisfies a long felt need for a relatively small pair size cable which is specially suited for use in a building plenum 28 (see FIG. 5). Such a cable must meet stringent requirements for flame spread and smoke evolution as well as for mechanical and electrical safety.

Turning again to the cable of this invention as shown in FIGS. 1-4, it can be seen that the core 21 is enclosed with a sheath system 30. The sheath system 30 which is non-metallic and which is characterized by a relatively low thermal conductivity delays for a predetermined time heat transfer into the core 21. Typical of the thermal conductivity values of the sheath 30 are those in the range of about 0.0001 to 0.001 cal. cm/cm$^2$ sec.°C.

As can be seen in the drawings, the sheath system 30 includes an inner layer 31 which is resilient so that it is capable of being compressed by the PVC conductor insulation 23 when it intumesces and expands under the application of heat. It has been found that a material which is an inorganic, cellular material is suitable for the inner layer 31. The heat resistance of the inner layer 31 is enhanced because of its cellular structure. The inner layer 31 is wrapped about the core 21 to form a longitudinal overlapped seam 32 which has a width of about 0.64 cm. Although the layer 31 in the preferred embodiment is wrapped to form a longitudinal seam, it could be wrapped helically about the core 21.

Flame retardancy and smoke suppression are also enhanced because the inner layer 31 is made of an inorganic cellular material which has a relatively low air permeability. According to the 2nd edition of Fairchild's Dictionary of Textiles which was published in 1970 by Fairchild Publications in New York, air permeability is defined as the degree of porosity in a fabric or the ease with which air passes through it. A standard test method for air permeability of textile fabrics is disclosed in ASTM D737-75. It is expressed in cubic feet per minute per square foot of fabric at a stated pressure differential between two surfaces. A relatively low air permeability may be in the range of about 20–75 cfm at a stated pressure differential whereas a relatively high value may be 200 at the same differential.

Because of its low air permeability, the inner layer 31 impedes the flow of air inwardly toward the core. Also, once the core 21 begins to degrade during a fire, the inner layer 31 impedes the outward flow of gases from the burnt PVC. This prevents the movement of smoke into a flame front which could cause ignition and flame spread.

For the preferred embodiment, these requirements are met by an inner layer which is made of a woven glass. The woven glass which generally is reflective may be one designated Ami-glas and marketed by Auburn Manufacturing, Inc. Woven glass is a textile of glass yarns which are weaved into place. Woven glass has a thermal conductivity in the range of about 0.0001 cal. cm/cm$^2$ sec.°C. and air permeability of about 50 cfm.

To provide thermomechanical and dielectric strengths, the outer portion of the cable system 20 includes at least one tape 40 (see FIG. 2). This is made of a thermosetting polymeric material which has at least translucent optical clarity and a thermal diffusivity of about 0.001 cm$^2$/sec. It has been found that Kapton ® polyimide film marketed by E. I. duPont is suitable for the tape 40. Kapton ® polyimide film is described in a brochure designated A62397 published by duPont. The thermal conductivity of the material of the tape 40 is in the range of about 0.00037 cal. cm/cm$^2$ sec.°C. The tape 40 is wrapped helically about the inner layer 31 with each wrap of the tape being overlapped about the prior wrap. Because of this manner of wrapping, the tape 40 appears as two concentric layers in FIG. 2.

In a preferred embodiment, the inner layer 31 is enclosed by two tapes. These are designated as inner and outer tapes 41 and 42, respectively (see FIG. 1). The inner and outer tapes 41 and 42 are helically wrapped about the inner layer 31 in opposite directions with each wrap of each tape being overlapped about fifty percent of the prior wrap. The amount of overlap and the angle of wrap to the longitudinal axis of the cable 20 is a function of the line speed of the core 21. It is also within the scope of this invention to wrap the tapes 41 and 42 about the core 21 to form longitudinal seams which are offset or to form one tape with a longitudinal overlapped seam and the other with a helical overlapped seam.

The overlapped seam of each of the tapes 41 and 42 must be sealed to prevent the escape of gases which are generated by decomposing PVC insulation during a fire to cause those gases to be directed longitudinally along the cable. In order to accomplish this, the tapes 41 and 42, which are each about 0.0025 cm thick have an adhesive, such as, for example, TEFLON ® fluorinated ethylene propylene marketed by E. I. duPont coated on either one or both sides thereof. The adhesive must be one which does not ignite prematurely, which has a melting point in the range of 250°–280° C. and which has a thermal diffusivity in the range of about 0.0008 to 0.001 cm$^2$/sec. It has been found that the tape having the adhesive coating on only one major surface exhibits a slightly better performance during a fire than one coated on both major surfaces. Further, the inner tape 41 is wrapped about the layer 31 so that the adhesive is disposed on an outwardly facing surface thereof while the outer tape is wrapped so that the adhesive faces inwardly.

As was mentioned hereinbefore, the cable system of U.S. Pat. No. 4,284,842 includes a metallic strip which is formed into a barrier that encloses the layer 31. The use of a heat reflective metallic shield, which may be necessary for the higher fuel content higher pair size cables, requires an extra manufacturing step, prevents the use of higher line speeds and results in a cable which for small pair sizes would be somewhat inflexible. The sheath system 30 of this invention which is suitable for cables having a relatively small number of conductor pairs does not include a metallic reflective barrier.

The manufacture of the cable 20 is facilitated by causing the sheath system 30 to have a relatively high heat absorptivity. As will be recalled, a reflective inner layer dissipates heat energy which is directed into the cable as it is moved along a manufacturing line to soften adhesive and seal the overlapped seams of the inner and outer tapes 41 and 42. If the inner layer 31, for example, is heat absorptive, more of the heat energy is retained at the interface between the inner layer and the outer tapes, thereby causing the sealing process to be more efficient. As a result, higher manufacturing speeds may be used.

Absorptive power or the absorptivity of a material is measured by the fraction of the radiant energy falling upon the material which is absorbed or transformed into heat. It is the ratio of the radiation absorbed by any material to that absorbed under the same conditions by a so-called black body. An arrangement or a material which will absorb all the radiant energy at all wavelengths and reflect none is called a perfect black body. This ratio varies with the character of the surface and the wavelength of the incident energy. In a chart on page E225 of the 54th edition of the Handbook of Chemistry and Physics as published by the CRC Press of Cleveland, Ohio, the coefficient of absorption of black matte is given as 0.97 whereas that for white lead paint is 0.25.

The sheath system 30 may be rendered heat absorptive in several ways. For example, the inner layer 31 may be made of a dark woven glass. Or, the inner layer 31 may be rendered heat absorptive by providing it with a dark facing 46 (see FIG. 6), such as with a dye or carbon black constituent. In still another embodiment, the woven glass of the layer 31 is unfaced but one of the tapes, preferably the inner tape 41, has its inner surface faced with a heat absorptive material. For example, as can be seen in FIG. 7, an inner surface 48 of the inner tape 41 is provided with a facing 49 comprising a black dye or carbon black constituent, for example. Heat absorptivity for the tapes 41 and 42 also may be provided by particular adhesive materials such as the earlier mentioned TEFLON ® propylene which are used to coat the tapes to facilitate the sealing of the seams.

In an alternative embodiment of a sheath system which is heat absorptive, the inner layer 31 may comprise a specially faced non-woven material in which the diameter of the fibers does not exceed six microns. In a non-woven glass material, fibers are cast in a binder and dried in ovens. The non-woven glass which is less dense than woven glass is somewhat less heat reflective than the woven glass. It has a thermal conductivity in the range of about 0.001 cal. cm/cm$^2$ sec.°C. In this alternative embodiment, either the non-woven glass is dark or is faced with a dark material such as carbon black, or one of the tapes 41 or 42 is faced with a dark material such as a suitable adhesive.

The components of the sheath system 30 cooperate to provide a system which delays the transfer of heat energy into the core 21 for a predetermined time. Because conductive heat transfer, which decomposes the conductor insulation 23 is delayed, smoke emission and hence further flame spread is controlled. The polyimide tapes 41 and 42 are not supportive of combustion, but they are translucent enough to permit ultraviolet heat energy to pass through. This heat energy, at least for a predetermined time, is reflected by the inner layer 31 of woven glass or is absorbed by the facing 49 of the Kapton ® material and/or that on the inorganic cellular layer 31.

Figure 8:
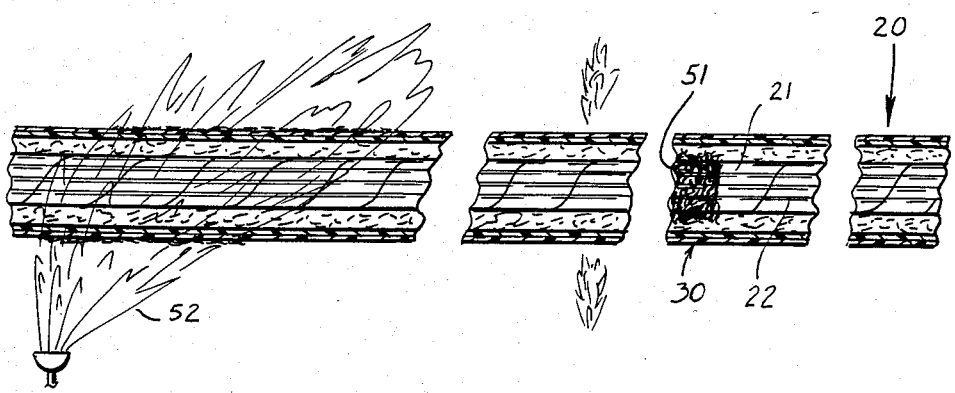
FIG. 8 is an elevational view of a portion of a length of cable being subjected to a flame in a test apparatus and shows the condition of the cable as a result of its exposure to the flame.

The mechanism of flame spread and smoke evolution may be demonstrated by using a well known Steiner Tunnel test in accordance with A.S.T.M. E84 as modified for communications cables and now referred to as Underwriters' Laboratories Test U.L. 910. Tests have shown that heat is transferred into the cable core 21 principally by thermal radiation, secondly by conduction and finally by convection. The intumescent process or carbonaceous charring of the PVC insulation along its outwardly facing surface acts to inhibit further degradation of the PVC by blocking internal convective air movements, and hence prevent the longitudinal travel of heated air which decomposes the insulation and causes smoke evolution. This is accomplished by charred PVC conductor insulation 51 (see FIG. 8) effectively blocking off a section of the length of cable 20 to localize further PVC decomposition in the portion of the cable adjacent to a flame 52. In effect, the cable 20 of this invention permits the PVC plastic insulating material to char under fire conditions.

It has been found that the tightness of the enclosure of the sheath, which comprises the inner layer 31, and the polyimide tapes 41 and 42 about the core, affects the amount of char that is formed, and could increase the evolution of smoke. Accordingly, care must be taken when wrapping the double layer of Kapton ® film material about the core to avoid compressing the inner layer 31. If this precautionary measure were not taken, the cellular layer 31 would be compressed, which reduces its effectiveness as a thermal barrier. Also, the PVC charring mechanism would be restricted, and this would lead to emission of volatile gases which might escape through the seams and ignite downstream. One way in which undue compression of the cellular layer 31 is accomplished is by controlling the amount of the overlap of the outer tape 42 over the inner tape 41. It has been found that the outer tape shield should overlap the inner tape by about 50%.

EXAMPLE

A core comprising four pairs of 24 gauge copper conductors individually insulated with a polyvinyl chloride insulation having a thickness of about 0.015 cm was enclosed in a non-woven glass strip having a thickness of 0.076 cm and a width of 3.81 cm. The strip was formed with a longitudinal overlapped seam having an overlapped seam of about 0.64 cm. The strip was a Manniglas 1200 strip made by the Manning Paper Company, having a weight of about 66 grams/square meter, an air permeability of about 120 cfm, and a thermal conductivity of 0.001 cal. cm/cm$^2$ sec.°C. For a woven glass, the air permeability is about 50 cfm. The glass layer 31 had a thermal diffusivity of 0.023 cm$^2$/sec and an average fiber diameter of 6.35 microns. This was covered with an inner tape made of a polyimide material, specifically duPont's Kapton ® "F" tape having a thickness of 0.0025 cm and a width of 2.54 cm. It was wrapped helically about the core such that each turn was overlapped about 50% of the prior turn. Kapton ® polyimide has a thermal diffusivity of 0.001 cm$^2$/sec and a refractive index of 1.78. A second Kapton ® polyimide tape having the same width and thickness as the first tape was wrapped helically in an opposite direction about the first tape. Each of the Kapton ® tapes had an inwardly facing surface coated with about 0.013 cm of a TEFLON ® fluorinated ethylene propylene adhesive marketed by duPont. The adhesive on the inner surface of the inner tape was carbonized and had a heat absorptivity of about 0.90 to 0.97. TEFLON ® FEP had a thermal diffusivity of 0.001 cm$^2$/sec and a melting point in the range of 253° C. to 282° C.

This cable was subjected to tests in a Steiner Tunnel in accordance with priorly mentioned Underwriters' Laboratories test UL 910 and exposed to the temperatures of 904° C., or incident heat fluxes as high as 6.3 watts/cm$^2$. Test 910 is a test method for determining the relative flame propagation and smoke generating characteristics of cable to be installed in ducts, plenums, and other spaces used for environmental air. Cables (1)–(4) having other constructions were tested and the results are tabulated below in Table 1 with cable (5) being the cable 20 of this invention.

TABLE 1

| | Core Wrap | Insulation | No. Cables | Flame Spread (FT) | Peak Optical Density |
|---|---|---|---|---|---|
| (1) Standard Inside Wiring PVC Jacket | None | PVC | 48 | 11 | 1.1 |
| (2) PVC Jacket in Conduit | | PVC | 30 | 3.5 | 0.375 |
| (3) HALAR ® Plastic | Glass | HALAR ® | 60 | 3.5 | 0.2 |
| (4) TEFLON ®-FEP Plastic | Glass | TEFLON ®-FEP | 70 | 3.5 | 0.08 |
| (5) Glass with Kapton ® Tape | Glass | PVC | 60 | 3.5 | 0.20 |
| (6) UL Test 910 requirements | | | | 5.0 | 0.50 |

As can be seen from Table 1, the cable 20 of this invention has properties which compare favorably with the PVC cable in a metal conduit and the TEFLON ®-FEP jacketed cable. Not only does it provide very acceptable flame spread protection, but also it is characterized by its ability to inhibit the evolution of smoke. A measure of smoke evolution is termed optical density which is an obscuration measurement over a length of time as seen by an optical detector. The lower the optical density, the lower and hence the more desirable is the smoke characteristic. Typical peak optical density values are 0.38 for PVC insulated and jacketed cable in metal conduit, 0.1 for TEFLON ® covered cables and 0.19 to 0.22 for the cable 20 in accordance with this invention.

The sheath system 30 of this invention (a) eliminates premature ignition at the overlapped seams; (b) delays the transfer of conducted heat to the core 21 which produces less PVC insulation deterioration which in turn produces less smoke and therefore less flame spread; (c) effectively absorbs the radiant energy present throughout the length of the UL test tunnel; and (d) allows the PVC insulation to char fully thereby blocking convective pyrolysis gas flow along the cable length.

It is to be understood that the above-described arrangements are simply illustrative of the invention. Other arrangements may be devised by those skilled in the art which will embody the principles of the invention and fall within the spirit and scope thereof.

What is claimed is:

1. A cable which resists flame spread and smoke evolution, said cable comprising:
   a core which includes at least one conductor enclosed in a plastic coating; and
   a non-metallic sheath system having a relatively low thermal conductivity which encloses said core and which is effective to provide a predetermined time delay prior to thermal decomposition of the conductor coating when the cable is subjected to a relatively high temperature, said sheath system including:
- a layer of an inorganic cellular material which encloses said core and which has a relativley low air permeability; and
- a tape which is wrapped about said layer and which comprises a flame retardant thermosetting material, said sheath system in the vicinity of the interface between said layer of cellular material and said tape including a material having a relatively high heat absorptivity.

2. The cable of claim 1, wherein said sheath system has a thermal conductivity in the range of 0.001 to 0.0001 cal-cm/cm$^2$-sec° C.

3. The cable of claim 1, wherein said layer of inorganic cellular material comprises a woven glass. a 4. The cable of claim 1 wherein said layer of inorganic cellular material has a relatively high heat absorptivity.

5. The cable of claim 4, wherein said layer of inorganic cellular material is a woven glass in which an outer surface is faced with a material having a relatively high heat absorptivity.

6. The cable of claim 4, wherein said layer comprises a nonwoven glass.

7. The cable of claim 6, wherein said outer surface of said layer is faced with a material having a heat absorptivity in the range of 0.90 to 0.97.

8. The cable of claim 1, wherein said sheath system includes first and second tapes which are wrapped about said layer of inorganic cellular material.

9. The cable of claim 8, wherein said first tape is disposed adjacent said layer of inorganic cellular material and an inner surface of said first tape is faced with a heat absorptive material.

10. The cable of claim 8, wherein each said tape is wrapped helically about the enclosed core so that each turn of said each tape overlaps about fifty percent of a preceeding turn of the same said tape.

11. The cable of claim 10, wherein each of said tapes has at least a portion of at least one major surface coated with an adhesive that seals the seam and that does not burn prematurely.

12. The cable of claim 11, wherein an outwardly facing surface of said first tape and an inwardly facing surface of said second tape are coated with an adhesive.

13. The cable of claim 12, wherein said adhesive has an index of heat absorptivity in the range of about 0.90–0.97.

14. The cable of claim 13, wherein each of said first and second tapes has at least a portion of at least one major surface coated with a fluorinated ethylene propylene adhesive.

* * * * *